3,406,189
AMINOPREGNANES
Leland L. Smith, Galveston, Tex., assignor to American Home Products Corporation, New York, N.Y., a corporation of Delaware
No Drawing. Filed Aug. 12, 1965, Ser. No. 479,325
4 Claims. (Cl. 260—397.3)

ABSTRACT OF THE DISCLOSURE

Aminopregnanes and particularly 21-aminoprogesterone and derivatives thereof are described having utility for the treatment of adrenal insufficiency.

---

This invention relates to mineralocorticoid agents and more particularly to 21-aminoprogesterone and certain acyl analogs thereof.

Physiologically active steroids have been found in compounds having the following general formula:

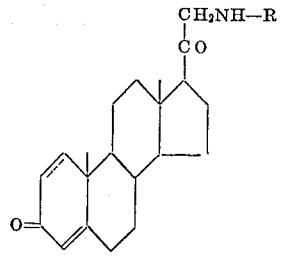

wherein R represents hydrogen or a lower alkanoyl group. The dotted line in the A ring is intended to represent a $C_1$-$C_2$ double bond as an alternative to the single bond between these carbons.

Compounds believed to be patentable have demonstrated an activity similar to certain corticoids and are deemed to have utility for the treatment of adrenal insufficiency.

The compounds may be prepared by the process described as follows:

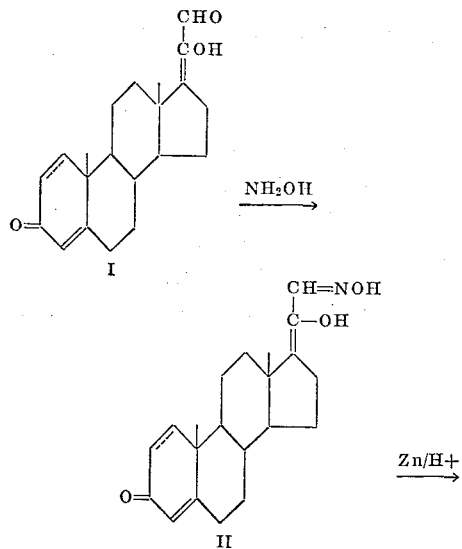

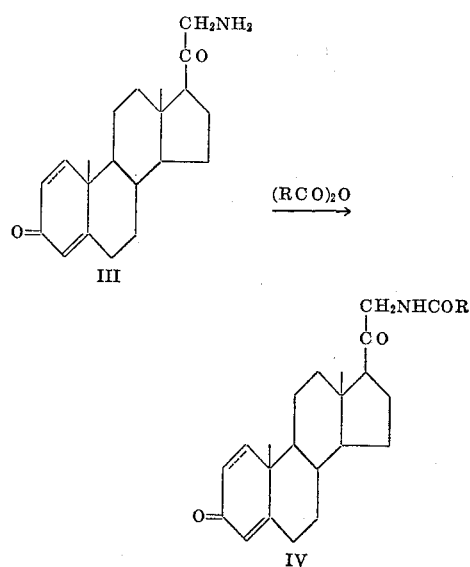

The reactions as illustrated above are carried out by treating the starting material, namely, the enol form of the 21-aldehyde of cortexone, represented as I, with hydroxylamine or a salt thereof to form the corresponding 21-oxime. This reaction is best carried out in a pyridine-ethanol solution under relatively mild conditions, preferably using a steam bath.

The 21-oxime as produced may then be subjected to a reduction step using powdered zinc and a lower aliphatic acid under room temperature conditions producing by this reaction the compound identified as III, namely the 21-amino derivative of progesterone or 21-amino-$\Delta^4$-pregnene-3,20-dione.

The 21-amino compound may then be reacted with acid anhydride at room temperature to form Compound IV, the 21-acylamino derivative of progesterone. Alternatively, if it is desired to make Compound IV directly from the 21-oxime, the reaction is carried out under similar conditions using zinc dust and a mixture of the lower aliphatic acid and the corresponding acid anhydride.

The above described reactions can also be utilized when the starting material is a $\Delta^1$-analog of Compound I, the final products then having a $\Delta^{1,4}$-configuration.

Example I

A solution of 3.0 g. of 20-hydroxy-3-oxopregna-4,17-(20)-dien-21-al [Caspi and Zajac, J. Chem. Soc., 586 (1964)] and 635 mg. of hydroxylamine hydrochloride in 50 ml. of 50% ethanolic pyridine was warmed on a steam bath for 90 min., after which time the solvents were removed under vacuum, and the gum thus obtained was dissolved in methanol, filtered, and precipitated with water. The product (2.08 g.) was recrystallized from aqueous methanol, thus affording the pure 21-oximino derivative, M.P. 202–203° dec.; $[\alpha]_D$ +180° (chloroform);

$\lambda_{max}^{KBr}$ 2.98, 3.11, 3.20, 5.99, 6.07, 6.10, 9.90$\mu$, etc.

*Analysis.*—Calcd. for $C_{21}H_{29}NO_3$: C, 73.43; H, 8.51; N, 4.08. Found: C, 73.40; H, 8.45; N, 4.09.

Example II

A stirred solution of 750 mg. of the oxime product of Example I in 45 ml. of acetic acid and 40 ml. of acetic anhydride was treated with 2.25 g. of zinc dust, added in small portions over 30 minutes. The mixture was stirred for 90 min. after zinc addition was complete. The mixture was filtered, the zinc filter cake was washed well with acetic acid, and the filtrate and washes were evaporated under vacuum. The residue was washed with water and taken up into methylene chloride. The methylene chloride solution was washed with water and aqueous sodium bicarbonate solution. The methylene chloride extract was dried and evaporated under vacuum, and the crystalline residue was recrystallized from acetone-hexane, thus yielding 260 mg. of pure amide product, M.P. 184–188°; $[\alpha]_D$ +158.3°; $\lambda_{max}$ 242.5 m$\mu$ ($\epsilon$ 15,600).

*Analysis.*—Calcd. for $C_{23}H_{33}NO_3$: C, 74.36; H, 8.95; N, 3.77. Found: C, 74.29; H, 8.94; N, 3.54.

Example III

A stirred solution of 850 mg. of the oxime product of Example I in 45 ml. of acetic acid was treated with 2.5 g. of zinc dust, added in small portions over 30 min. After addition of zinc was complete, the mixture was stirred for an additional 90 min., after which time it was filtered, and the filter cake was washed with acetic acid. The combined filtrate and washes were evaporated under vacuum, and the yellow gum thus obtained was taken up in acidified methanol and precipitated with diethyl ether. The solids thus obtained consist mainly of the desired product 21 - aminoprogesterone, but in an impure state. Further purification of the sought product is obtained by spotting the material across several thin-layer chromatoplates (1 mm. thick layers of silica gel) and developing the plates with chloroform-methanol (9:1) previously saturated with conc. ammonia. The appropriate zones on the developed chromatoplate which respond to the Dragendorff reagent and which give a yellow ninhydrin color test, are eluted with chloroform, the eluates evaporated under vacuum, and the crystalline 21 - aminoprogesterone thereby recovered. The product is characterized by infrared absorption at 3.00, 3.47, 5.86, 6.00, and 6.20$\mu$.

Example IV

A solution of 100 mg. of 21-aminoprogesterone in dry pyridine is treated with 0.5 ml. of acetic anhydride. After three hours, the solvents are removed under vacuum and the residue is crystallized from acetone-hexane, thus yielding 21-acetylaminoprogesterone, the same product as described in Example II.

Example V

A solution of 50 mg. of 21-aminoprogesterone in dry pyridine is treated with 0.3 ml. of propionic acid anhydride. After three hours, the solution is evaporated under vacuum and the residue is crystallized several times from acetone-hexane, to yield the pure 21 - propionylaminoprogesterone.

Example VI

A solution of 21 - aminoprogesterone in dry ether is treated with anhydrous hydrogen chloride. The solvent is evaporated to yield the pure hydrochloride salt of 21-aminoprogesterone.

Example VII

A solution of 1.0 g. of 20 - hydroxy - 3 - oxypregna-1,4,17(20) - trien - 21 - al [Herzog, et al., J. Am. Chem. Soc., 83, 4073 (1961)] in 50% ethanolic pyridine is treated with 1 equivalent of hydroxylamine hydrochloride. The mixture is warmed on a steam bath for one hour, after which time the solvents are removed under vacuum. The gummy residue is dissolved in methanol, precipitated with water, and recrystallized from aqueous methanol several times, yielding thus the pure 20 - hydroxy-3-oxypregna-1,4,17(20)-trien-21-al 21-oxime.

Example VIII

The 20 - hydroxy - 3 - oxo - 1,4,17(20)-trien-21-al 21-oxime of Example VII is dissolved in acetic acid containing acetic anhydride in the same manner as described in Example II. The stirred solution is treated with an excess of zinc dust for two hours, the zinc dust removed by filtration, and the solution concentrated under vacuum. The residue thus obtained is crystalized from acetone-hexane, and recrystallization from the same solvent pair several times affords the pure 21-acetylamino-$\Delta^1$-progesterone.

The compounds of the invention may be used as such, or in the form of pharmaceutically acceptable acid-addition salts derived by treating the basic material with an organic or inorganic acid prepared in generally known manner and as illustrated by Example VI. The active compounds or their salts may be used orally or parenterally, for example in the form of tablets, capsules or in liquid form as suspensions, when intended for oral use, or in solution when used parenterally. The usual binders, excipients and carriers or suspending agents are contemplated, depending on the desired form of administration. Aqueous or oleaginous vehicles may be used for preparing solutions or suspensions. A dosage range of 0.01 to 2 mg./kg. of body weight will be found to product effective action.

It is to be understood that the temperatures given above are in degrees centigrade.

I claim:
1. A compound selected from the group consisting of a steroid having the formula:

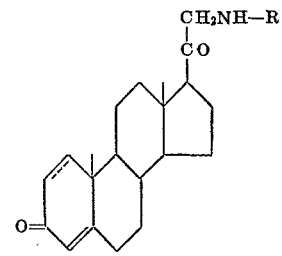

wherein R stands for a member of the group consisting of hydrogen and lower alkanoyl while the dotted line in the A ring represents a bond between carbons 1 and 2 from the group consisting of a single and double bond, and pharmaceutically acceptable acid-addition salts thereof.

2. The compound, 21-amino progesterone.
3. The compound, 21-amino progesterone hydrochloride.
4. The compound 21-acetylamino progesterone.

References Cited

UNITED STATES PATENTS 2,920,999    1/1960    Agnello et al.    167—65
3,020,275    2/1962    Marx et al.    260—239.55

OTHER REFERENCES

Smith et al.: Journ. Amer. Chem. Soc., vol. 84, April 1962, pp. 1265–1270.

LEWIS GOTTS, *Primary Examiner.*

E. G. LOVE, *Assistant Examiner.*